United States Patent [19]
Corlett et al.

[11] Patent Number: 5,125,504
[45] Date of Patent: Jun. 30, 1992

[54] MODULAR CONVEYOR CHAIN HAVING OPEN HINGE PIN CONSTRUCTION

[75] Inventors: Ricky O. Corlett; Dennis A. Woyach, both of Milwaukee, Wis.

[73] Assignee: Rexnord Corporation, Milwaukee, Wis.

[21] Appl. No.: 666,579

[22] Filed: Mar. 8, 1991

[51] Int. Cl.$^5$ .............................. B65G 17/06
[52] U.S. Cl. ..................... 198/850; 198/853
[58] Field of Search ............. 198/850, 851, 852, 853

[56] References Cited

U.S. PATENT DOCUMENTS

| | | | |
|---|---|---|---|
| D. 270,201 | 8/1983 | Hodlewsky et al. | D34/29 |
| D. 270,202 | 8/1983 | Hodlewsky et al. | D34/29 |
| 506,456 | 10/1893 | Adt | 198/853 |
| 723,390 | 5/1903 | Graham | 403/184 |
| 1,160,057 | 11/1915 | Ensign | 198/834 |
| 1,922,908 | 8/1933 | Coleman | 198/851 X |
| 2,165,422 | 7/1939 | Stanius | 198/851 |
| 2,681,728 | 6/1954 | Boron | 198/851 |
| 3,095,753 | 7/1963 | Lengyel | 198/851 X |
| 3,602,364 | 8/1971 | Maglio et al. | 198/689.1 |
| 3,641,831 | 2/1972 | Palmaer | 74/250 |
| 3,672,488 | 6/1972 | Collins | 198/834 |
| 3,774,752 | 11/1973 | Harvey | 198/852 |
| 3,785,476 | 1/1974 | Poerink | 198/853 |
| 3,870,141 | 3/1975 | Lapeyre et al. | 198/689.1 |
| 3,934,712 | 1/1976 | Jende | 198/850 X |
| 3,985,224 | 10/1976 | Harvey | 198/851 |
| 4,023,239 | 5/1977 | Stolz | 198/851 X |
| 4,051,949 | 10/1977 | Lapeyre | 198/853 |
| 4,140,025 | 2/1979 | Lapeyre | 74/255 R |
| 4,159,763 | 7/1979 | Kewley et al. | 198/853 |
| 4,213,527 | 7/1980 | Lapeyre et al. | 198/853 |
| 4,438,838 | 3/1984 | Hodlewsky et al. | 198/853 |
| 4,469,221 | 9/1984 | Albert | 198/851 |
| 4,473,365 | 9/1984 | Lapeyre | 474/212 |
| 4,688,670 | 8/1987 | Lapeyre | 198/853 |
| 4,709,807 | 12/1987 | Poerink | 198/851 X |
| 4,765,454 | 8/1988 | Hodlewsky et al. | 198/853 X |
| 4,886,158 | 12/1989 | Lapeyre | 198/853 |

FOREIGN PATENT DOCUMENTS

| | | | |
|---|---|---|---|
| 0113669 | 10/1900 | Fed. Rep. of Germany | 198/852 |
| 1239982 | 5/1967 | Fed. Rep. of Germany . | |
| 2144290 | 8/1971 | Fed. Rep. of Germany . | |
| 3913077 | 11/1989 | Fed. Rep. of Germany | 198/853 |
| 1199151 | 7/1970 | United Kingdom . | |

OTHER PUBLICATIONS

D & B Products Brochure, "The History of Plastic Modular Belting".

Primary Examiner—Robert P. Olszewski
Assistant Examiner—James R. Bidwell
Attorney, Agent, or Firm—Michael, Best & Friedrich

[57] ABSTRACT

A modular conveyor belt composed of a plurality of modules. Each module comprises an integrally formed body having a planar conveying surface and pivotal coupling structure on a pair of opposite sides of the body. The pivotal coupling structure on one side of the body being complementary to that on the other side thereof whereby the module may be pivotally connected to like modules on the opposite sides thereof to form the conveyor belt. The pivotal coupling structure comprises a plurality of spaced apart pivot structures projecting from each side of the module and below the planar surface and each including a pair of spaced eyelets having openings coaxial with the openings of the other eyelets on the same side of the module for receiving a hinge pin therethrough and defining an axial direction, the hinge structures on each side of the module being spaced apart from each other in the axial direction and from the hinge structure on adjacent modules when the module is coupled to an adjacent module to define gaps therebetween. The gaps between the eyelets and the hinge structures expose substantial portions of the pin disposed in the openings for inspection and cleaning.

16 Claims, 3 Drawing Sheets

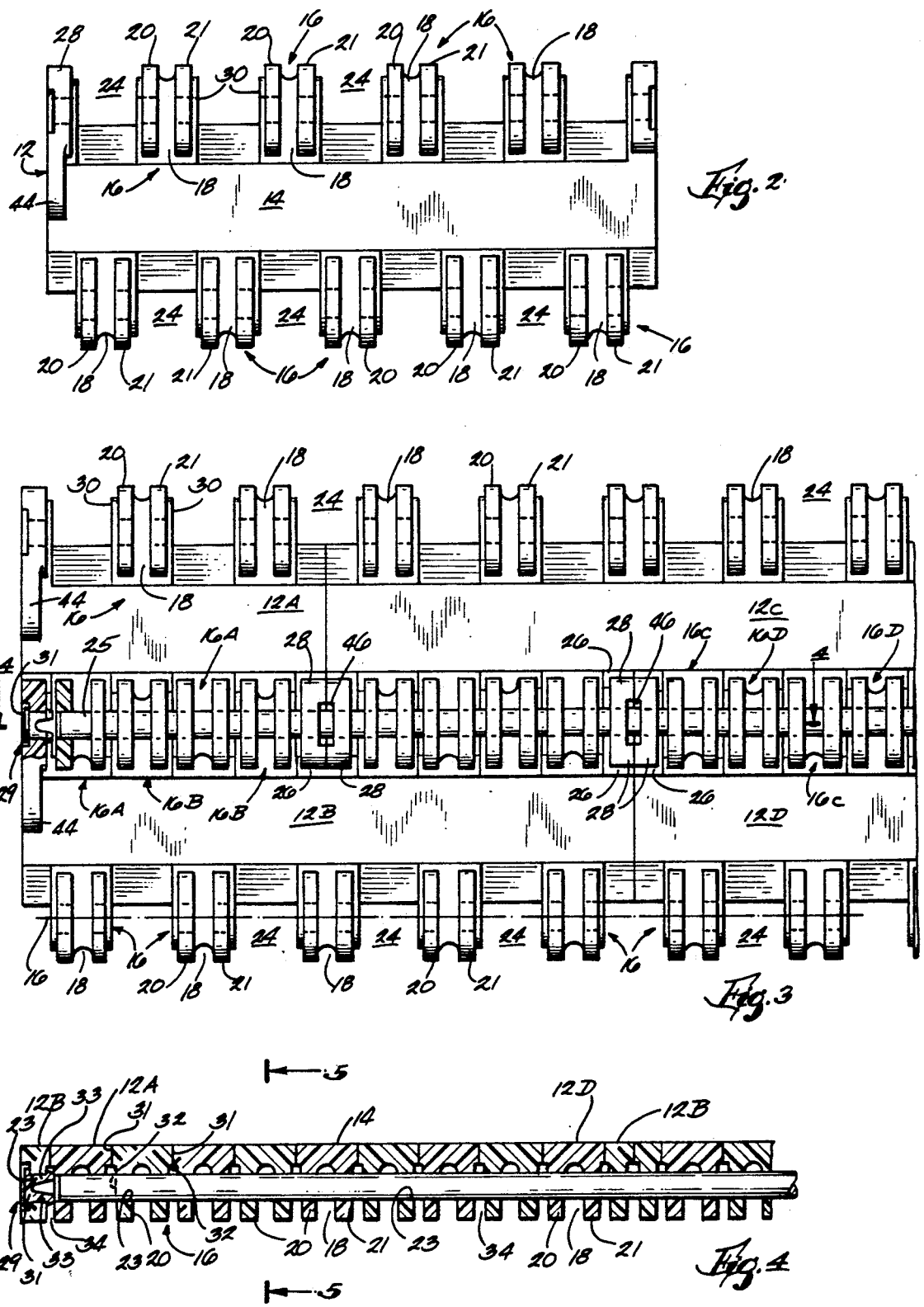

MODULAR CONVEYOR CHAIN HAVING OPEN HINGE PIN CONSTRUCTION

BACKGROUND OF THE INVENTION

This invention relates to conveyors and more particularly to a new and improved modular chain for chain link conveyors.

Modular chain belting for conveyors and the like typically comprise a plurality of individual modules having ends which pivotally connect to adjacent modules to form an endless belt. Such belts can be fabricated in any desired length and width by assembling plural modules in a side-by-side and endwise relation. One common method of pivotally connecting such modules is by means of elongated pins which extend through complementary eyes integrally formed on each module side or end.

Chain conveyors employed for transporting food products are commonly fabricated of a plastic or stainless steel material and include an imperforate, planar web and a side or end connection structure which is intended to minimize locations where food products can be trapped and readily permit cleaning and inspection. One example of such a conveyor belt is disclosed in U.S. Pat. No. 4,213,527 (FIG. 9). However, this prior art module was not wholly satisfactory because the eyes at each module end cover a substantial portion of the connecting pivot pin. This seriously impedes inspection and cleaning of the pin and the bore in each eye through which the pin extends. Another shortcoming is that each such prior art module includes a bottom rib for strength and for being engaged by the drive sprocket. This rib provides a collection area for contaminants and further impedes cleaning and inspection. Other prior art modules of this type were similarly unsatisfactory for transporting meat products because of the inclusion of sprocket guides intermediate the sides of the module which similarly impeded inspection and cleaning.

SUMMARY OF THE INVENTION

It is an object of the invention to provide a new and improved module for a link chain conveyor.

Another object of the invention is to provide a link chain conveyor having modules which facilitate inspection and cleaning.

A further object of the invention is to provide a module for link chain conveyors which is configured to minimize the collection of contaminants.

Yet another object of the invention is to provide a module for link chain conveyors having maximum strength while also having hinge portions which permit inspection and cleaning of the connecting hinge pin and hinge pin passages in the modules.

A still further object of the invention is to provide a link chain belt which presents a substantially imperforate surface for supporting food products and which is configured to provide gaps at the hinge pin when the belt passes over a sprocket to permit inspection and cleaning.

These and other objects and advantages of the present invention will become more apparent from the detailed description thereof taken with the accompanying drawings.

According to one aspect, the invention comprises a module for use in a modular conveyor belt composed of a plurality of modules. The module comprises an integrally formed body having a planar conveying surface and pivotal coupling structure on a pair of opposite sides of the body, the pivotal coupling structure on one side of the body being complementary to that on the other side thereof whereby the module may be pivotally connected to like modules on the opposite sides thereof to form the conveyor belt. The pivotal coupling structure includes a plurality of spaced apart pivot structures projecting from each side of the module and below the planar surface and each defining openings coaxial with the openings of the other hinge structure on the same side of the module for receiving a hinge pin therethrough and defining an axial direction, the hinge structure on each side of the module being spaced apart from each other in the axial direction and from the hinge structure on adjacent modules when the module is coupled to an adjacent module to define a first series of gaps between the hinge means. Each of the hinge structures includes at least a pair of portions spaced apart in the axial direction and each has an individual hole formed therein to provide a second series of gaps between the hinge portions. The gaps between the hinge structures and the portions thereof expose substantial portions of a pin structure disposed therein for inspection and cleaning.

According to another aspect, the invention comprises a modular conveyor belt composed of a plurality of modules. Each of the modules comprises an integrally formed body having a planar conveying surface and pivotal coupling structure on a pair of opposite sides of the body, the pivotal coupling structure on one side of the body being complementary to that on the other side thereof whereby the module may be pivotally connected to like modules on the opposite sides thereof to form the conveyor belt. The pivotal coupling structure includes a plurality of spaced apart pivot means projecting from each side of the module and below the planar surface and each defines an opening coaxial with the openings in the other hinge structure on the same side of the module for receiving a hinge pin therethrough and defining an axial direction. The hinge structures on each side of the module are spaced apart from each other in the axial direction and from the hinge structure on adjacent modules to define a first series of gaps between the hinge means and each hinge means includes at least a pair of hinge portions spaced apart in the axial direction and each having an individual opening formed therein to provide a second series of gaps between the hinge portions to expose a pin structure disposed therein for inspection and cleaning. Each of the modules may also include web means formed between the hinge structures and extending over the gap therein and including a surface complementary to the surface on the hinge structure of an adjacent module so that the gaps between the hinge structure and the hinge portions of the hinge structure are covered by the web structure when adjacent modules are coplanar, the web structure being configured such that the gaps between the hinge structure and the hinge portions of the hinge structure are exposed when adjacent modules are pivoted through a predetermined angle to permit inspection and cleaning of the pin structure from all sides of the conveyor belt.

According to another aspect, the invention comprises a module for use in a modular conveyor belt composed of a plurality of modules, the module comprising an integrally formed body having a planar conveying surface and pivotal coupling structure on a pair of opposite sides of the body. The pivotal coupling structure on one side of the body being complementary to that on the other side thereof whereby the module may be pivotally connected to like modules on the opposite sides thereof to form the conveyor belt. The pivotal coupling structure includes a plurality of spaced apart pivot structures projecting from each side of the module and below the planar surface and defining an axial direction. Each pivot structure includes at least a pair of hinge portions spaced apart in the axial direction and each having an individual opening formed therein and coaxial with the openings of the other hinge structure for receiving a hinge pin therethrough so that the module may be hingedly coupled to an adjacent module. The gaps between the hinge portions exposing a pin structure disposed therein for inspection and cleaning.

According to a still further aspect, the invention comprises a modular conveyor belt composed of a plurality of modules, each of the modules comprising an integrally formed body having a planar conveying surface and pivotal coupling structure on a pair of opposite sides of the body. The pivotal coupling structure on one side of the body is complementary to that on the other side thereof whereby the module may be pivotally connected to like modules on the opposite sides thereof to form the conveyor belt. The pivotal coupling structure includes a plurality of spaced apart pivot structures projecting from each side of the module and below the planar surface for defining an axial direction. Each pivot structure includes at least a pair of hinge portions spaced apart in the axial direction and each having an individual opening formed therein and coaxial with the openings in the other hinge structure for receiving a hinge pin therethrough thereby hingedly coupling the modules to each other. The gaps between the hinge portions expose a hinge pin disposed therein for inspection and cleaning.

BRIEF DESCRIPTION OF THE DRAWINGS

FIG. 2 is a bottom view of a module according to the preferred embodiment of the invention;

FIG. 3 is a bottom view of a portion of the conveyor chain illustrated in FIG. 1;

FIG. 4 is a view taken along lines 4——4 of FIG. 3;

DETAILED DESCRIPTION OF THE PREFERRED EMBODIMENT

Figure 1:
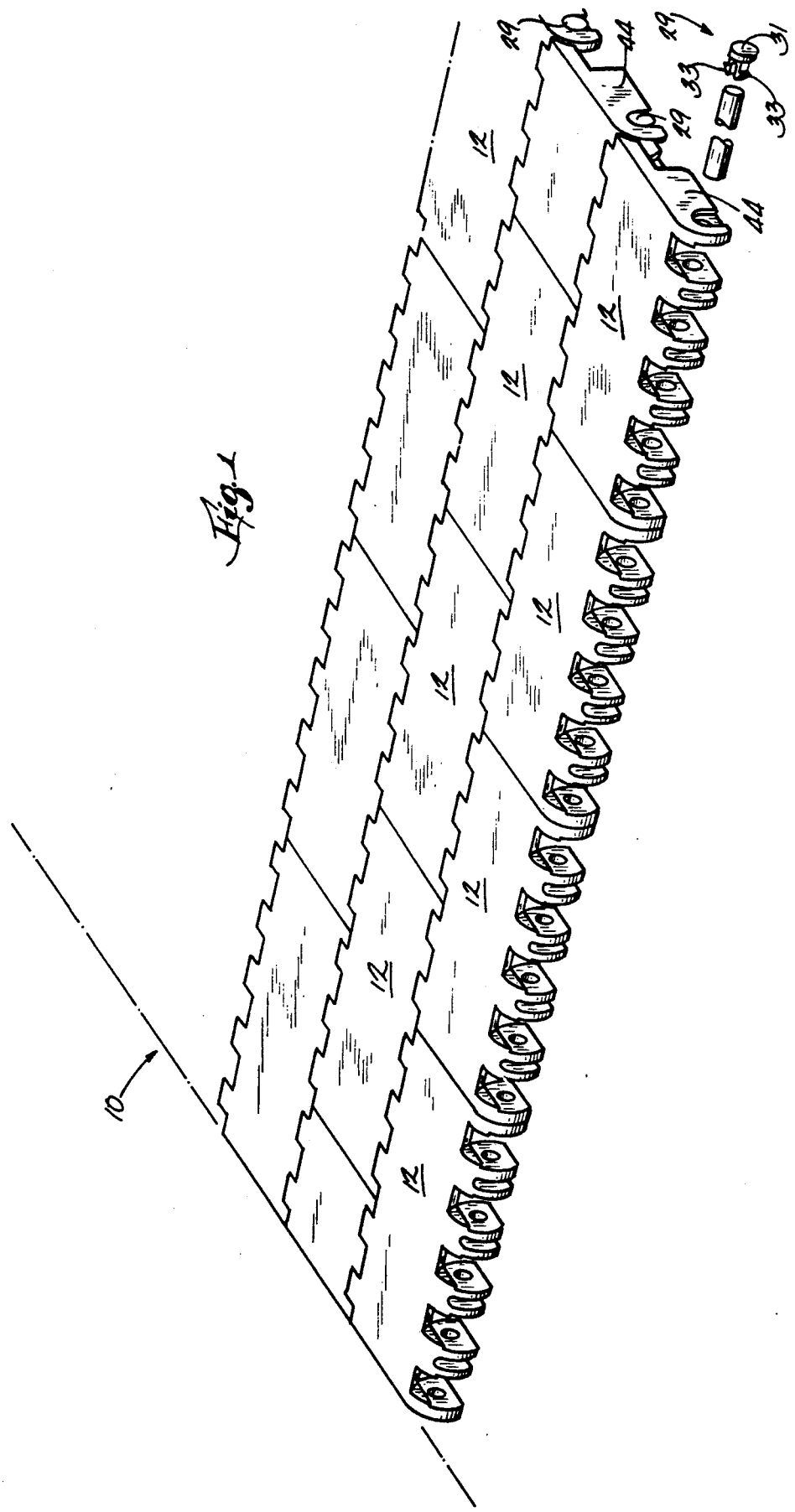
FIG. 1 is a perspective view showing a portion of a conveyor chain incorporating modules according to the invention.
Figure 5:
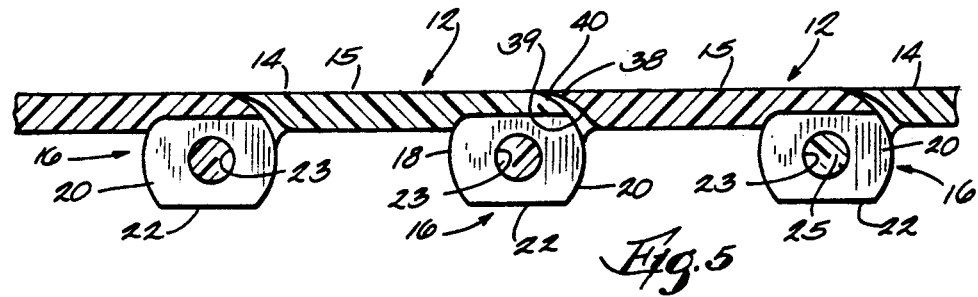
FIG. 5 is a view taken along lines 5——5 of FIG. 4.

FIG. 1 shows a link conveyor belt 10 formed of a plurality of modules 12 in accordance with the preferred embodiment of the invention. As seen in FIGS. 2, 3 and 5, each module 12 comprises a web portion 14 having a planar upper surface 15 and a plurality of aligned, spaced apart pivot structures which take the form of eye portions 16 extending from each side of the web portion 14. In the preferred embodiment of the invention, a central slot 18 is formed in each eye portion 16 to define a pair of generally parallel hinge means or eyelets 20 and 21. In other arrangements more than one slot could be provided. Each eyelet 20 and 21 is generally annular except for a flat bottom surface 22 and each has a transverse opening 23 which is in a coaxial aligned relation with the openings 23 of all of the other eyelets on that side of the module. As those skilled in the art will appreciate, modules 12 may be formed of any suitable plastic material, such as, polypropylene, acetal or nylon.

The eye portions 16 at one side of each module are staggered relative to those on the other side and there are an even number at one side and an odd number at the other. In addition, the gaps 24 between adjacent eye portions 16 are slightly larger than the width of the eye portions 16 so that the opposite sides of the modules are complementary to each other and the eye portions 16A of a first module 12A will be received between the eye portions 16B at the complementary side of a second, adjacent module 12B as shown in FIG. 4. This permits the modules 12A, 12B, 12C, 12D and so on to be assembled in end- to-end relation by pins 25 extending through openings 23 to form the link conveyor belt 10. As best shown in FIG. 1, in a preferred assembly of modules embodying the invention the modules are bricked or arranged in rows such that modules in one row are offset laterally with respect to the modules in an adjacent row and such that the edges of all modules are not aligned in the direction of movement of the chain.

It can also be seen in FIG. 3 that at one side of each module 12A, 12B, 12C and 12D the eye portions 16 are spaced inwardly from the end a distance about one-half the width of the gaps 24 to provide a notch 26 for receiving a single eyelet 28 of the complementary side of the adjacent module.

As seen in FIG. 3, the outer surfaces 30 of the eye portions 12 include an abutment 31 at its upper end and an inwardly curved surface portion 32 immediately below. In addition, each of the surfaces 30 is inclined inwardly at a slight angle from the abutment 31 downwardly to its lower end. When the modules 12 are assembled as shown in FIGS. 3 and 4, the slot 18 not only provides a gap between eyelets 20 and 21 of each eye portion 16, but the configuration of the eyelet portions provide gaps 34 between the eyelets of adjacent eye portions as seen in FIG. 4. As a result, substantial portions of the pin 25 between eyelets 20 and 21 and between adjacent eye portions 16 are exposed for inspection and cleaning. Furthermore, the relatively thin eyelet portions 20 and 21 permit inspection of the pin 25 within the holes 23 as well as the surfaces of the holes themselves.

Figure 6:
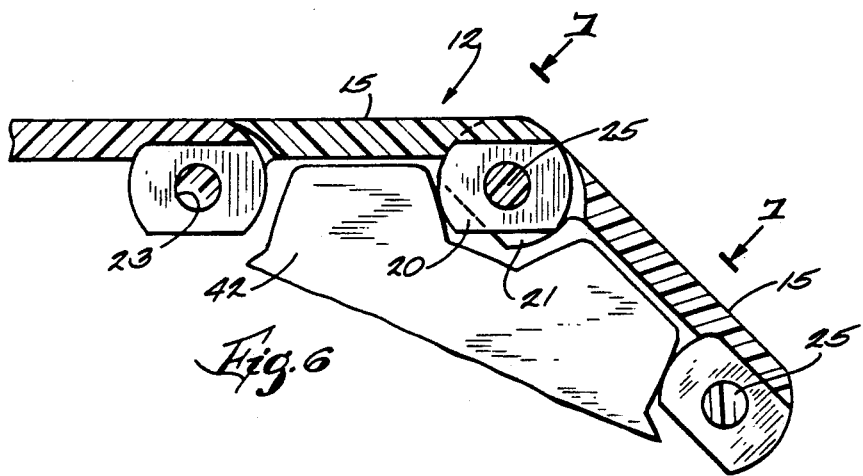
FIG. 6 shows the position of the modules illustrated in FIG. 5 when the conveyor chain is passing around a sprocket.
Figure 7:
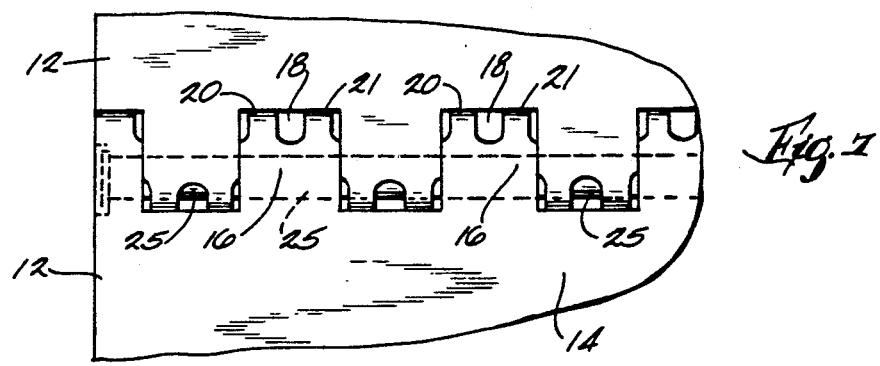
FIG. 7 is a view taken along lines 7——7 of FIG. 6.
Figure 8:
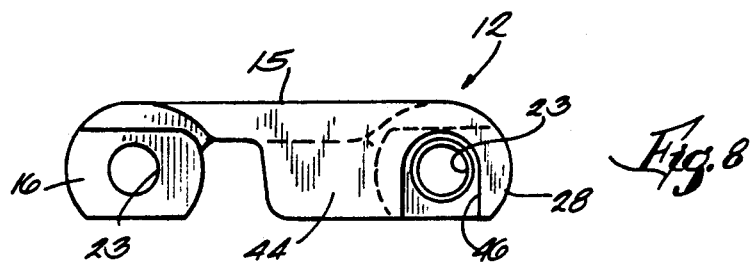
FIG. 8 is a side view of the module shown in FIG. 2.

With reference to FIGS. 5 and 6, it can also be seen that the central slot 18 penetrates only partially into the underside of the web 14. In addition, the portion of the web 38 between the eye portion 16 has a lower surface 39 which is arcuate and tapered upwardly so that it is generally complementary to the opposite end surface 40 of the eye portion 16. Thus, when the modules 12 are in their conveying orientation in which the surfaces 15 are coplanar, the web portion 38 covers the gaps defined by slot 18 between the eyelets 20 and 21 and the gaps 34 between adjacent eye portions 16. However, when the chain 10 passes around a sprocket 42, as seen in FIGS. 6 and 7, so that the surfaces 15 are oriented at an angle, the gap between the eyelets and the gap 34 between the eye portions are uncovered. This permits inspection or the spraying of a cleaning fluid onto the pins 25.

It can also be seen in FIG. 6 that the teeth of the sprocket 42 engage the eye portions 16. Therefore, the modules 12 do not require ribs or other projections on their lower surface for engagement by the sprocket 42, thereby minimizing impediments on the module to inspection or cleaning. The planar lower surface on the eyelets 20 and 21 provides a wear surface functioning to provide additional support for the modular chain and also minimizes interference with the sprocket 42.

As best seen in FIGS. 3 and 4 in a preferred form of the invention the hinge pins are held in place by plugs 29 housed in the eyelets 28 at the ends of the modules located at the sides of the conveyor. The eyelets 28 include a counterbore adapted to house the head 41 of the snap-in plug 29 and such that the head 41 of the plug is generally flush with the side of the module. The plug 29 also includes a pair of legs 43 which can extend through the link end 28 and having ends for engaging the inside surface of the link ends.

The modules 12 in each link chain belt 10 are identical except that the end modules in alternating rows have a length which is approximately one-half the length of the remaining modules and except that each of the modules at the ends of the rows includes a tracking tab 44 provided at the outer end of that module. The tracking tabs 44 of each end module extends downwardly with respect to the upper surface of the module and defines a guide surface for engaging the conveyor or sprockets and for maintaining alignment of the chain on the conveyor. The tracking tabs function to provide stability to the chain of the conveyor frame and prevent the chain from wandering laterally with respect to the conveyor and sprockets due to possible misalignment of the conveyor shafts, application of side loading to the chain or expansion and contraction or the chain due to temperature changes of the chain environment of wash fluids. By providing tracking tabs 44 only on the ends of those modules forming the sides of the belt 10, impediments to inspection and cleaning are minimized, while still providing a means for maintaining tracking of the belt on the sprockets and conveyor.

Cleaning and inspection is also facilitated by a generally U-shaped slot 46 formed in the eyelets at the end of each module so that when the eyelets are abutted against each other, as shown in FIG. 3, a cavity, which is open at the bottom, will be provided which further enhances the ability to inspect and clean the pin.

One of the advantages of the conveyor chain construction defined above is that the configuration of the top or carrying surface of the modules and including the top surfaces of the eye portion 16 and the interengagement of the eye portions 16 of adjacent modules limits contaminants from working into the pin area. The webs between eyelets 20 and 21 and forming the upper surface of the eye portions 16 provide a uniform product supporting surface and no access is provided for contaminants between eyelets 20 and 21. The eye portions 16 thus provide fewer access cracks or joints in the belt construction.

Another principal advantage of the invention is that the hinge design facilitates cleaning of the modules and the hinge pin while also providing a chain with high tensile strength. The tensile strength of the chain depends in part on the number of shear points along the length of the chain pin. Since the link ends 16 each include two eyelets 20 and 21, a large number of shear points are provided along the length of the chain hinge pin, and accordingly, tensile forces on the chain are distributed to the hinge pin through a large number of shear points.

While only a single embodiment of the invention is illustrated and described, the invention is not limited thereby, but only by the scope of the appended claims.

We claim:

1. A module for use in a modular conveyor belt composed of a plurality of modules disposed in a side-by-side and end-to-end relation, said module comprising an integrally formed body having a substantially imperforate upper planar conveying surface and pivotal coupling means on a pair of opposite sides of said body, the pivotal coupling means on one side of the body being complementary to that on the other side thereof whereby said module may be pivotally connected to like modules on the opposite sides thereof to form the conveyor belt, the ends of each module being constructed and arranged to abut adjacent modules to define a planar conveying surface and inhibit endwise movement of the module, said pivotal coupling means including a plurality of spaced apart hinge means projecting from each side of the module and below the planar surface and each defining an opening coaxial with the openings of the other hinge means on the same side of the module for receiving a hinge pin therethrough and defining an axial direction, the hinge means on each side of the module being spaced apart from each other in the axial direction and from the hinge means on adjacent modules when the module is coupled to an adjacent module to define a first series of gaps between said hinge means, each of said hinge means including a pair of hinge portions spaced apart in the axial direction and each having an individual opening formed therein to provide an additional series of gaps between said hinge portions, said gaps exposing a pin means disposed therein for inspection and cleaning.

2. The module set forth in claim 1 wherein the module includes a lower surface formed between the hinge means on the opposite sides of the module, said undersurface being free of obstructions except for the hinge means.

3. The module set forth in claim 2 wherein each module is formed with a hinge means along each end and the hinge means at the opposite sides being spaced from the ends, the hinge means at the end of the one side of each module having a recess surrounding said opening and being open along a lower edge thereof whereby a recess around the pin will be defined when a pair of said modules are located in a side-by-side relation with the end hinge means abutting the hinge means of an adjacent module.

4. A modular conveyor belt composed of a plurality of modules disposed in a side-by-side and end-to-end relation, each of said modules comprising an integrally formed body having a substantially imperforate upper planar conveying surface and pivotal coupling means on a pair of opposite sides of said body, the pivotal coupling means on one side of the body being complementary to that on the other side thereof whereby said module may be pivotally connected to like modules on the opposite sides thereof, each module having ends which abut the ends of adjacent modules to form the conveyor belt, said pivotal coupling means including a plurality of spaced apart hinge means projecting from each side of the module and below the planar surface and each defining an opening coaxial with the openings of the other hinge means on the same side of the module for receiving a hinge pin therethrough and defining an axial direction, the hinge means on each side of the module being spaced apart from each other in the axial direction and from the hinge means on adjacent modules to define a first series of gaps between said hinge means, each of said hinge means include a pair of hinge portions spaced apart in the axial direction and each having an individual opening formed therein to provide a second series of gaps between said hinge portions, pin means extending through said openings for pivotally coupling said modules, said gap exposing the pin means for inspection and cleaning, the abutting ends of said modules restraining adjacent modules from relative movement in the axial direction.

5. A modular conveyor belt composed of a plurality of modules, each of said modules comprising an integrally formed body having an upper planar conveying surface and pivotal coupling means on a pair of opposite sides of said body, the pivotal coupling means on one side of the body being complementary to that on the other side thereof whereby said module may be pivotally connected to like modules on the opposite sides thereof to form the conveyor belt, said pivotal coupling means including a plurality of spaced apart hinge means projecting from each side of the module and below the planar surface and each defining an opening coaxial with the openings of the other hinge means on the same side of the module for receiving a hinge pin therethrough and defining an axial direction, the hinge means on each side of the module being spaced apart from each other in the axial direction and from the hinge means on adjacent modules to define a first series of gaps between said hinge means, each of said hinge means including a pair of hinge portions spaced apart in the axial direction and each having an individual opening formed therein to provide a second series of gaps between said hinge portions, pin mans extending through said openings for pivotally coupling said modules, said gap exposing the pin means for inspection and cleaning, each of said modules also including web means formed between said hinge means and extending over the gap therebetween and including a surface complementary to the surface on the hinge means of an adjacent module so that the gaps between said hinge portions are covered by said web means when adjacent modules are coplanar, said web means being configured such that the gaps between said hinge portions are exposed when adjacent modules are pivoted through a predetermined angle to permit inspection and cleaning of said pin means from either side of said conveyor belt.

6. The modular conveyor belt set forth in claim 5 wherein said modules each include a lower surface formed between the hinge means on the opposite sides of the module, said lower surfaces being free of obstructions except for the hinge means.

7. The modular conveyor belt set forth in claim 6 wherein each of said modules is formed with a hinge means along each end and the hinge means at the opposite sides being spaced from the ends, the hinge means at the end of the one side of each module having a recess surrounding said opening and being open along a lower edge thereof whereby an opening around the pin will be defined when a pair of said modules are located in a side-by-side relation with the end hinge means abutting the hinge means of an adjacent module.

8. A module for use in a modular conveyor belt composed of a plurality of modules, said module comprising an integrally formed body having an upper planar conveying surface and pivotal coupling means on a pair of opposite sides of said body, said module also having a pair of opposite ends constructed and arranged to abut an adjacent module, the pivotal coupling means on one side of the body being complementary to that on the other side thereof whereby said module may be pivotally connected to like modules on the opposite sides thereof and abutted against adjacent modules to form the conveyor belt, said pivotal coupling means including a plurality of spaced apart hinge means projecting from each side of the module and below the planar surface defining an axial direction, each hinge means including a pair of hinge portions spaced apart in the axial direction from each other and the ends of the module and having an individual opening formed therein and coaxial with the openings of the other hinge means for receiving a hinge pin therethrough so that said module may be hingedly coupled to an adjacent module, the gaps between said hinge portions and the hinge portions and the ends of the module exposing a pin means disposed therein for inspection and cleaning.

9. The module set forth in claim 8 wherein the module includes a lower surface formed between the hinge means on the opposite sides of the module, said lower surface being free of obstructions except for the hinge means.

10. A module as set forth in claim 8 wherein the integrally formed body has opposite ends and further including a tracking tab extending downwardly from one of said opposite ends, the tracking tab including a vertical surface adapted to be engaged by means for maintaining the modular conveyor belt in alignment on a conveyor.

11. A modular conveyor belt composed of a plurality of modules, each of said modules comprising an integrally formed body having a planar conveying surface and pivotal coupling means on a pair of opposite sides of said body, the ends of adjacent modules being disposed in an abutting relation, the pivotal coupling means on one side of the body being complementary to that on the other side thereof whereby said module may be pivotally connected to like modules on the opposite sides thereof to form the conveyor belt with abutting adjacent modules having a planar conveying surface, said pivotal coupling means including a plurality of spaced apart hinge means projecting from each side of the module and below the planar surface and for defining an axial direction, each hinge means including a pair of hinge portions spaced apart in the axial direction and each having an individual opening formed therein and coaxial with the openings in the other hinge means, a hinge pin extending through said openings for hingedly coupling said modules to each other, the gaps between said hinge portions exposing the pin means for inspection and cleaning.

12. A modular conveyor belt composed of a plurality of modules, each of said modules comprising an integrally formed body having a planar conveying surface and pivotal coupling means on a pair of opposite sides of said body, the pivotal coupling means on one side of the body being complementary to that on the other side thereof whereby said module may be pivotally connected to like modules on the opposite sides thereof to form the conveyor belt, said pivotal coupling means including a plurality of spaced apart hinge means projecting from each side of the module and below the planar surface and for defining an axial direction, each hinge means including a pair of hinge portions spaced apart in the axial direction and each having an individual opening formed therein and coaxial with the openings in the other hinge means, a hinge pin extending through said openings for hingedly coupling said modules to each other, the gaps between said hinge portions exposing the pin means for inspection and cleaning, each of said modules also including web means formed between adjacent hinge means and extending over thee gaps therein and including a surface complementary to the surface on the hinge means of an adjacent module so that the gaps between said hinge portions are covered by said web means when adjacent modules are coplanar, said web means being configured such that the gap between said hinge portions are exposed when adjacent modules are pivoted through a predetermined angle to permit inspection and cleaning of said pin means from either side of said conveyor belt.

13. The modular conveyor belt set forth in claim 12 wherein each of the modules includes a lower surface formed between the hinge means on the opposite sides of the module, said undersurface being free of obstructions except for the hinge means.

14. A module for use in a modular conveyor belt composed of a plurality of modules, said module comprising an integrally formed body having an upper planar conveying surface and pivotal coupling means on a pair of opposite sides of said body, the pivotal coupling means on one side of the body being complementary to that on the other side thereof whereby said module may be pivotally connected to like modules on the opposite sides thereof to form the conveyor belt, said pivotal coupling means including a plurality of spaced apart hinge means projecting from each side of the module and below the planar surface and each defining an opening coaxial with the openings spaced apart from each other in the axial direction and from the hinge means on adjacent modules when the module is coupled to an adjacent module to define a first series of gaps between said hinge means, each of said hinge means including a pair of hinge portions spaced apart in the axial direction and each having an individual opening formed therein to provide an additional series of gaps between said hinge portions, said gaps exposing a pin means disposed therein for inspection and cleaning, each hinge means including means extending across the gap between said hinge portions and defining an upper surface which forms a continuation of the conveying surface, said upper surface being complementary to the upper surface on the hinge means of an adjacent module to provide a substantially unbroken surface with the conveying surfaces of said modules when said conveying surfaces are coplanar.

15. A module for use in a modular conveyor belt composed of a plurality of modules, said module comprising an integrally formed body having an upper planar conveying surface and pivotal coupling means on a pair of opposite sides of said body, the pivotal coupling means on one side of the body being complementary to that on the other side thereof whereby said module may be pivotally connected to like modules on the opposite sides thereof to form the conveyor belt, said pivotal coupling means including a plurality of spaced apart hinge means projecting from each side of the module and below the planar surface defining an axial direction, each hinge means including a pair of hinge portions spaced apart in the axial direction and having an individual opening formed therein and coaxial with the openings of the other hinge means for receiving a hinge pin therethrough so that said module may be hingedly coupled to an adjacent module, the gaps between said hinge portions exposing a pin means disposed therein for inspection and cleaning, each hinge means including means extending across the gap between said hinge portions and defining an upper surface which forms a continuation of the conveying surface, said upper surface being complementary to the upper surface on the hinge means of an adjacent module to provide a substantially unbroken surface with the conveying surfaces of said modules when the conveying surfaces are coplanar.

16. A conveyor belt composed of a plurality of modules, each said module comprising an integrally formed body portion having an upper planar conveying surface and pivotal coupling means on a pair of opposite sides of said body, the sides of adjacent modules disposed in an abutting relation along their edges to define a substantially imperforate conveying surface, the pivotal coupling means on one side of the body being complementary to that on the other side thereof whereby said module may be pivotally connected to like modules on the opposite sides thereof to form the conveyor belt, said pivotal coupling means including a plurality of spaced apart hinge means projecting from each side of the module and below the planar surface defining an axial direction, each hinge means including a pair of hinge portions spaced apart from each other and from the hinge portions of adjacent modules in the axial direction and each hinge portion having an individual opening formed therein and coaxial with the openings of the other hinge portions for receiving a hinge pin therethrough so that said module may be hingedly coupled to an adjacent module, the gaps between said hinge portions exposing a pin means disposed therein for inspection and cleaning, said body portion extending across the gap between said hinge portions at the upper conveying surface with the gap being exposed therebelow.

* * * * *